US012219056B2

(12) United States Patent
Hamburg

(10) Patent No.: US 12,219,056 B2
(45) Date of Patent: Feb. 4, 2025

(54) MASKING OF KEY GENERATION OPERATIONS WITH RANDOM MATRICES IN CRYPTOGRAPHIC APPLICATIONS

(71) Applicant: Cryptography Research, Inc., San Jose, CA (US)

(72) Inventor: Michael Alexander Hamburg, 's-Hertogenbosch (NL)

(73) Assignee: Cryptography Research, Inc., San Jose, CA (US)

( * ) Notice: Subject to any disclaimer, the term of this patent is extended or adjusted under 35 U.S.C. 154(b) by 146 days.

(21) Appl. No.: 18/082,837

(22) Filed: Dec. 16, 2022

(65) Prior Publication Data

US 2023/0198752 A1 Jun. 22, 2023

Related U.S. Application Data

(60) Provisional application No. 63/311,992, filed on Feb. 19, 2022, provisional application No. 63/290,534, filed on Dec. 16, 2021.

(51) Int. Cl.
*H04L 9/08* (2006.01)
(52) U.S. Cl.
CPC .................. *H04L 9/0869* (2013.01)
(58) Field of Classification Search
CPC ...... G06F 21/14; G06F 21/602; G06F 21/604; H04L 9/003; H04L 9/0861; H04L 9/0869; H04L 9/302; H04L 9/3033; H04L 2209/04–046; H04L 2209/16
See application file for complete search history.

(56) References Cited

U.S. PATENT DOCUMENTS

| 6,763,366 | B2 | 7/2004 | Hars et al. |
| 7,068,785 | B2 | 6/2006 | Perkins |
| 8,577,028 | B2 | 11/2013 | Ebeid et al. |
| 2022/0045839 | A1* | 2/2022 | Kreimer ................ H04L 9/0643 |
| 2023/0048825 | A1* | 2/2023 | Urian .................... H04L 1/0063 |
| 2023/0224285 | A1* | 7/2023 | Howe .................... H04L 9/3093 |
| | | | 713/166 |

OTHER PUBLICATIONS

Aciicmez, Onur et al., "New Branch Prediction Vulnerabilities in OpenSSL and Necessary Software Countermeasures", In Proceedings of the 11th IMA international Conference on Cryptography and Coding (Cryptography and Coding'07). Springer-Verlag, Berlin, Heidelberg, 2007, 185-203. 16 pages.
De La Fe, Sadiel et al., "Profiling Attack Against RSA Key Generation Based on a Euclidean Algorithm", Information 2021, https://doi.org/10.3390/info12110462, https://www.mdpi.com/journal/infomration. 12 pages.

* cited by examiner

*Primary Examiner* — Kevin Bechtel
(74) *Attorney, Agent, or Firm* — Lowenstein Sandler LLP

(57) ABSTRACT

Disclosed are systems and techniques for enhanced protection of cryptographic key generation in cryptographic applications. In particular, described is a method and a system that performs the method of obtaining input numbers associated with a cryptographic application, generating masking matrix based on at least one random value, obtaining masked numbers using a matrix product of the MM and the input numbers, determining a greatest common divisor (GCD) of the masked numbers, identifying a GCD of the input numbers, and using the identified GCD to generate a cryptographic key.

20 Claims, 5 Drawing Sheets

MASKING OF KEY GENERATION OPERATIONS WITH RANDOM MATRICES IN CRYPTOGRAPHIC APPLICATIONS

CROSS-REFERENCE TO RELATED APPLICATIONS

This application claims the benefit of priority from U.S. Provisional Application No. 63/311,992, filed on Feb. 19, 2022, and U.S. Provisional Application No. 63/290,534, filed on Dec. 16, 2021, which are incorporated herein by reference.

TECHNICAL FIELD

The disclosure pertains to cryptographic computing applications, more specifically to improving efficiency of cryptographic operations with a cryptographic engine capable of parallel and streaming computations.

BRIEF DESCRIPTION OF THE DRAWINGS

The present disclosure will be understood more fully from the detailed description given below and from the accompanying drawings of various implementations of the disclosure.

DISCLOSURE

Figure 4:
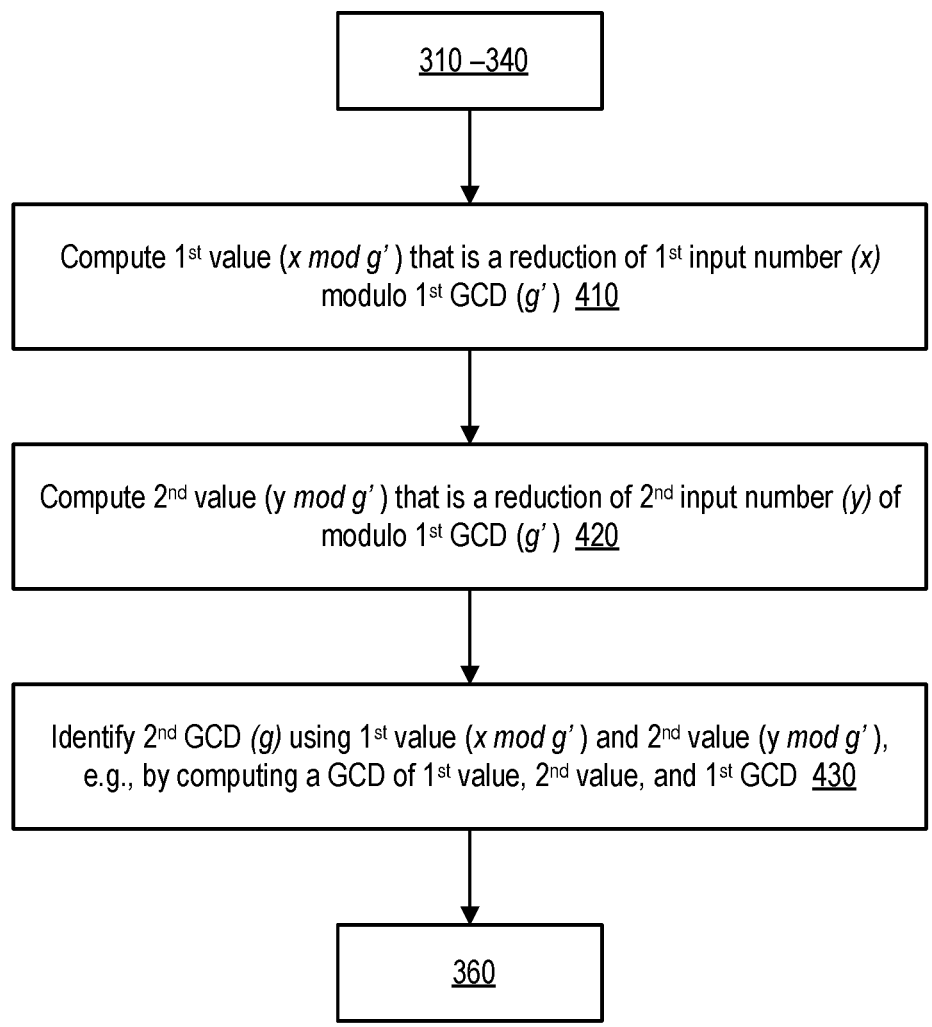

FIG. 4 is a flow diagram depicting a method of recovering a target GCD based on a GCD of masked inputs in the course of matrix-based masking of cryptographic key generation, in accordance with one or more aspects of the present disclosure.

Figure 5:
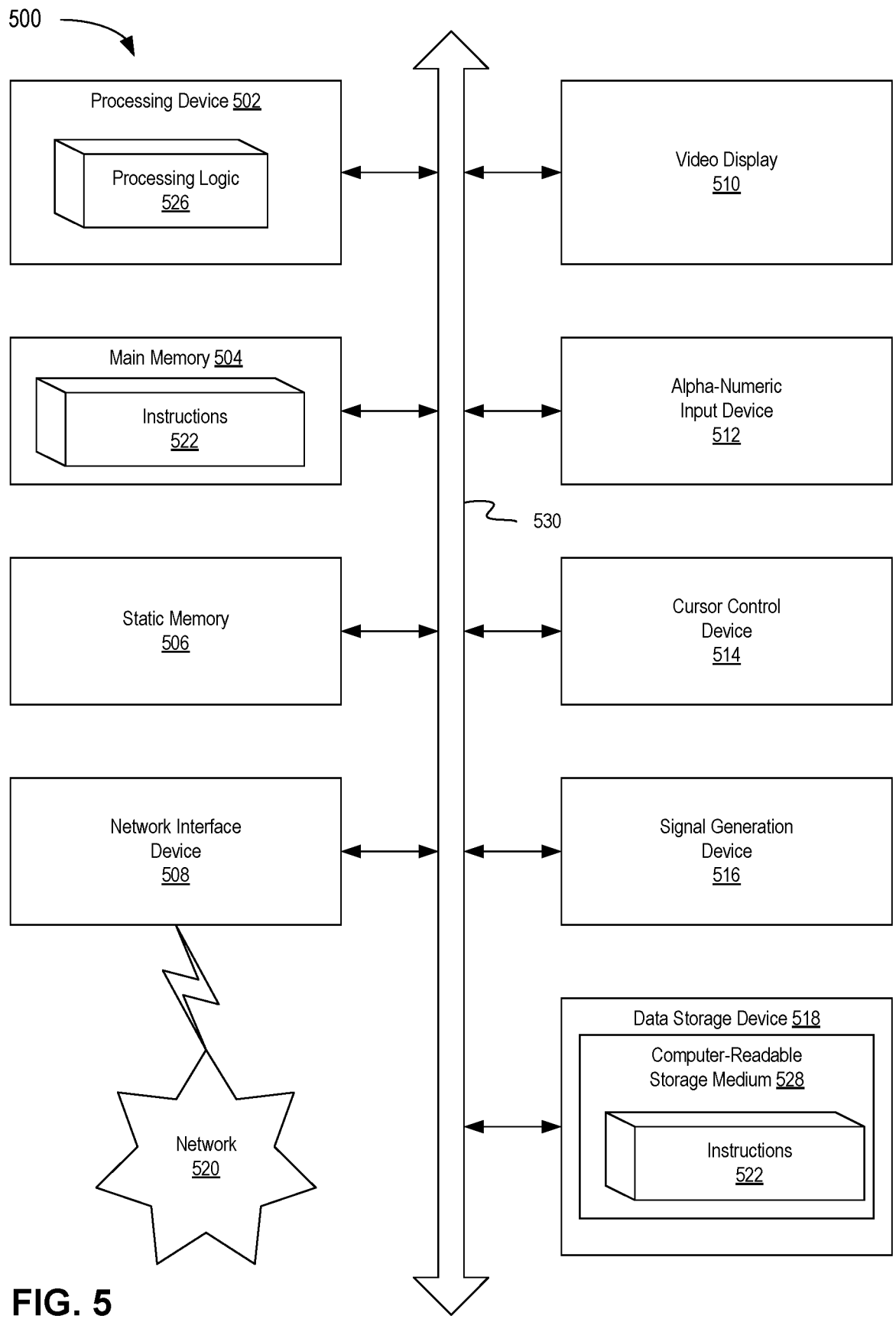

FIG. 5 depicts a block diagram of an example computer system operating in accordance with one or more aspects of the present disclosure.

DETAILED DESCRIPTION

Modern computational and data-storing applications often operate with information that is maintained in secrecy. Confidential information may include secret messages that need to be protected from unauthorized accesses, cryptographic keys, as well as various other secret data. However, even a data that is well protected against brute-force attempts to identify a cryptographic key that protects the data may not be secure if the key is exposed to a physical attack, e.g., a side-channel attack. A side-channel attack may be performed by monitoring physical emissions produced by electronic circuits of the targeted device. Such emissions may be of acoustic, electric, magnetic, optical, thermal types, and so on. In one example, a laser voltage (laser timing) probing technique may involve monitoring a bus or another interconnect by a spectrograph that uses a laser to determine variations of the optical response (e.g., reflectivity) while a sequence of bits of secret information is being processed or communicated. If the same sequence of bits is communicated repeatedly, an attacker can correlate variations in the optical response of the bus (or the memory device itself) with 0s and 1s of the secret information. Upon collecting a sufficient amount of statistical correlations, the attacker may be able to access the secret information.

Various popular cryptographic algorithms and platforms can be targets for side-channel attacks that aim to determine a cryptographic key during initial key generation or subsequent application of the generated key. In Rivest-Shamir-Adelman (RSA) asymmetric public key/private key applications, a message m may be encrypted into a ciphertext c using modular exponentiation that uses a public encryption exponent e, $c = m^e$ mod N, and can be decrypted using another modular exponentiation, $m = c^d$ mod N, that uses a private (secret) decryption exponent d. The modulus $N = p \cdot q$ is typically a product of large prime numbers p and q. During key generation, the public encryption exponent e and the private decryption exponent d are selected to be inverse of each other modulo a certain number, e.g., the lowest common multiplier (LCM) of p−1 and q−1. The LCM of p−1 and q−1 may be computed as the ratio of the product of (p−1)(q−1) and the greatest common divisor (GCD) of p−1 and q−1. Additionally, GCD computations may be used to perform co-primality tests, e.g., to verify that p−1 and q−1 are coprime with the public exponent e.

Various algorithms of GCD computation, e.g., binary extended Euclidean algorithm (BEEA), can leak secret information. For example, various operations (iterations) of BEEA are contingent on various values (derived from secret numbers) being odd or even, e.g., with division by 2 operations performed for even values, subtraction operations performed for odd values, and so on). Because the parity of a number is determined by its least significant bit, a side-channel attacker can identify such bits of secret data by measuring power consumption, which may be different for division, e.g., bit-shifting, operations and subtraction operations, or by measuring various other physical responses. Existing techniques to protect against such attacks include blinding, with a random number r, of one or both numbers x and y, whose GCD is being computed, e.g., by determining GCD(x+ry, y) or GCD(rx, ry)/r, which all are equal to the target value GCD (x, y). However, such blinding techniques, while improving protection against side-channel attacks, are less effective against attacks capable of recovering all the bits of both blinded values rx and ry.

Aspects of the present disclosure address these and other shortcomings of the existing technology by disclosing implementations directed to, among other things, efficient masking of GCD and modular inversion operations that may be used in cryptographic applications. As described in more detail below, input numbers x, y . . . into a GCD (and/or a modular inversion) operation, GCD(x, y), may be masked using elements of a masking matrix that may include one or more random elements, to obtain masked input numbers x', y'. The GCD (and/or a modular inversion) operation may then be performed on the masked input numbers, GCD(x', y'), and the result of such an operation may be used to determine the target value GCD(x, y) without subjecting the input numbers to a possible side-channel attack. In some implementations, the two values may be the same, D(x, y)=GCD(x', y'). As described in more detail below, this happens with certainty in situations where the determinant of the masking matrix is equal to one, and probabilistically, in the situations where the determinant the masking matrix has some other value. In the latter instances, an additional set of operations may be performed to identify the target value GCD(x, y) based on the computed value GCD(x', y'), as described in more detail below. Furthermore, a modular inverse $x^{-1}$ mod y operation may be performed in the course of computing GCD(x, y) and verifying that the computed value is equal to one, GCD(x, y)=1, which may be similarly performed by first computing the GCD of the masked values, GCD(x', y'). The advantages of the disclosed implementations include, but are not limited to, enhanced protection of key generation operations and secret values (e.g., private keys) against side-channel attacks.

Figure 1:
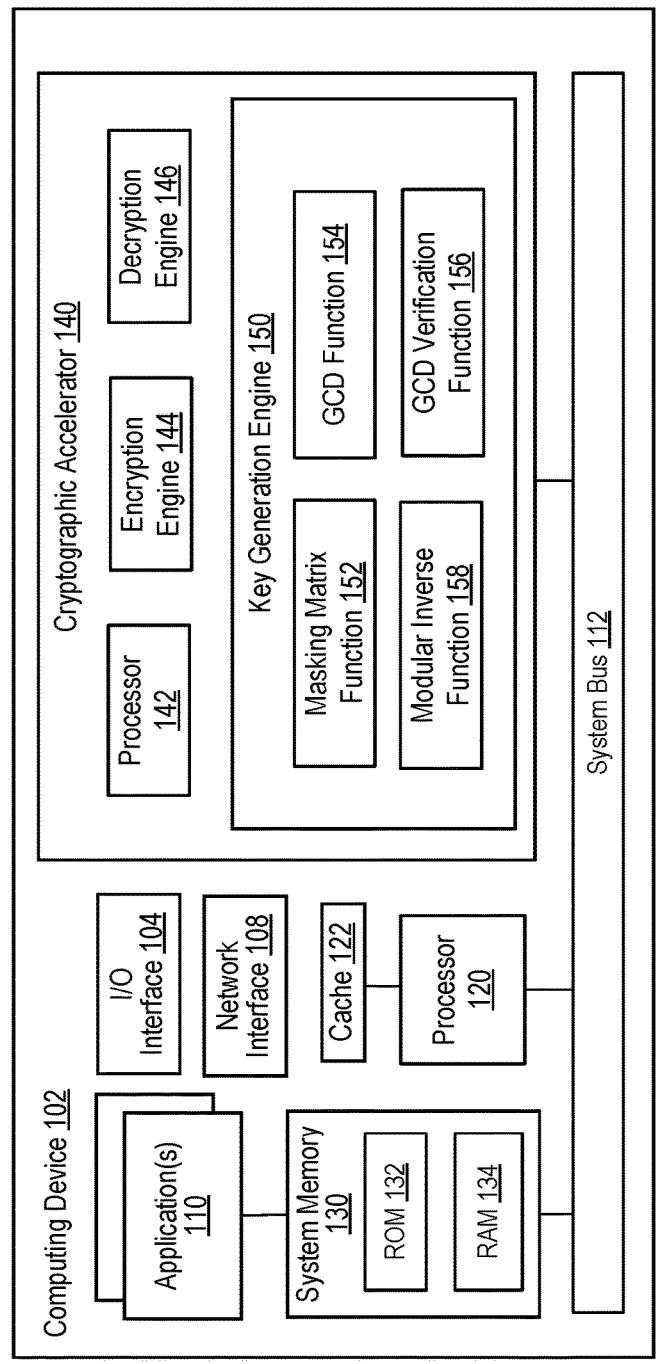
FIG. 1 is a block diagram illustrating an example system architecture in which implementations of the present disclosure may operate.

FIG. 1 is a block diagram illustrating an example system architecture 100 in which implementations of the present disclosure may operate. The example system architecture 100 may include a computing device 102, whose processing operations are to be protected against side-channel attacks. Computing device 102 may be any desktop computer, a tablet, a smartphone, a server (local or remote), a thin/lean client device, a server, a cloud computing node, and the like. In some implementations, computing device 102 may be an edge device or any device having limited computational resources, but operating in a security-sensitive domain, e.g., a network switch, a gateway device, a card reader, a wireless sensor node, an Internet-of-Things (IoT) node, an embedded system dedicated to one or more specific applications, and so on.

Computing device 102 may have one or more processors 120, e.g., CPUs, GPUs, field-programmable gate arrays (FPGA), application-specific integration circuits (ASICs), and the like. "Processor" refers to a device capable of executing instructions encoding arithmetic, logical, or I/O operations. In one illustrative example, a processor may follow Von Neumann architectural model and may include one or more arithmetic logic units (ALUs), a control unit, and may further have access to a plurality of registers, or a cache 122.

Computing device 102 may have access to one or more system memory 130 devices. The system memory 130 may refer to any volatile or non-volatile memory and may include a read-only memory (ROM) 132, a random-access memory (RAM) 134, as well as (not shown) electrically erasable programmable read-only memory (EEPROM), flash memory, flip-flop memory, or any other device capable of storing data. RAM 134 may be a dynamic random-access memory (DRAM), synchronous DRAM (SDRAM), a static memory, such as static random-access memory (SRAM), and the like. In some implementations, processor(s) 120 and the system memory 130 may be implemented as a single controller, e.g., as an FPGA.

Computing device 102 may further include an input/output (I/O) interface 104 to facilitate connection of the computing device 102 to various peripheral hardware devices (not shown) such as card readers, terminals, printers, scanners, IoT devices, and the like. Computing device 102 may further include a network interface 108 to facilitate connection to a variety of networks (Internet, wireless local area networks (WLAN), personal area networks (PAN), public networks, private networks, etc.), and may include a radio front end module and other devices (amplifiers, digital-to-analog and analog-to-digital converters, dedicated logic units, etc.) to implement data transfer to/from computing device 102. Various hardware components of the computing device 102 may be connected via a system bus 112 that may include its own logic circuits, e.g., a bus interface logic unit (not shown).

Computing device 102 may support one or more applications 110. Application(s) 110 supported by computing device 102 may include machine-learning application(s), graphics application(s), computational application(s), cryptographic application(s) (such as authentication, encryption, decryption, secure storage application(s), etc.), embedded application(s), external application(s), or any other types of application(s) that may be executed by computing device 102. Application(s) 110 may be instantiated on the same computing device 102, e.g., by an operating system executed by the processor 120 and residing in the system memory 130. Alternatively, the external application(s) 110 may be instantiated by a guest operating system supported by a virtual machine monitor (hypervisor) operating on the computing device 102. In some implementations, the external application(s) may reside on a remote access client device or a remote server (not shown), with the computing device 102 providing computational and/or cryptographic support for the client device and/or the remote server.

The processor 120 may include one or more processor cores having access to a single or multi-level cache 122 and one or more hardware registers. In implementations, each processor core may execute instructions to run a number of hardware threads, also known as logical processors. Various logical processors (or processor cores) may be assigned to one or more application(s) 110, although more than one processor core (or a logical processor) may be assigned to a single application for parallel processing. A multi-core processor may simultaneously execute multiple instructions. A single-core processor may typically execute one instruction at a time (or process a single pipeline of instructions). The processor 120 may be implemented as a single integrated circuit, two or more integrated circuits, or may be a component of a multi-chip module.

Computing device 102 may include a cryptographic accelerator 140, which may be a separate hardware engine equipped with a separate processor 142 and memory (not shown). Cryptographic accelerator 140 may have an encryption engine 144 to support encryption operations, such as RSA exponentiation of plaintext messages to a power determined by a public exponent. Cryptographic accelerator 140 may have a decryption engine 146 to support decryption operations, e.g., exponentiation of ciphertext messages to a power determined by a private exponent. Cryptographic accelerator 140 may further include a key generation engine 150 to support computations performed during generation of various parts of the public/private key combinations including but not limited to prime numbers p and q, modulus p q, public exponent e, private exponent d, and the like.

Key generation engine 150 may include multiple functions to support obfuscation (masking, blinding) of various secret key values (e.g., values p, q, d, etc.). For example, key generation engine 150 may include a masking matrix function 152 that selects (generates) a matrix of desired properties, e.g., a matrix with all random elements, a matrix with at least some random elements and the determinant of one, a matrix with at least some elements numbers and an odd-valued determinant, and so on. The masking matrix may be used to obfuscate secret information, e.g., secret values p, q (or values p-1, q-1). Key generation engine 150 may also include a GCD function 154 that executes various GCD computational algorithms (e.g., the Euclidean algorithm, the binary Euclidean algorithm, the extended binary Euclidean algorithm, the Bernstein-Yang algorithm, and the like) on the masked values obtained by masking matrix function 152. Since outputs of GCD algorithms performed on masked input values may be different from the outputs of the same algorithms performed on the actual secret input values, key generation engine 150 may further include a GCD verification function 156 to check whether the obtained GCD values of masked inputs coincide with the correct GCD values of the actual inputs. In some implementations, GCD verification function 156 may execute a number of various operations (as described below in conjunction with FIG. 2) to obtain the target GCD values of the actual inputs from the obtained GCD values of masked inputs. In some implementations, key generation engine 150 may also include a modular inverse function 158, which operates in conjunction with GCD function 154, e.g., uses routines and algorithms executed by GCD function 154 to compute modular inverses of various inputs (e.g., masked inputs).

Any functions or engines depicted as part of cryptographic accelerator 140 may be implemented via dedicated hardware circuits (e.g., multiplication, addition, division circuits), or as software modules executed on any suitable processor (e.g., processor 142 or processor 120), or as any combination of dedicated hardware circuits and software modules.

Figure 2:
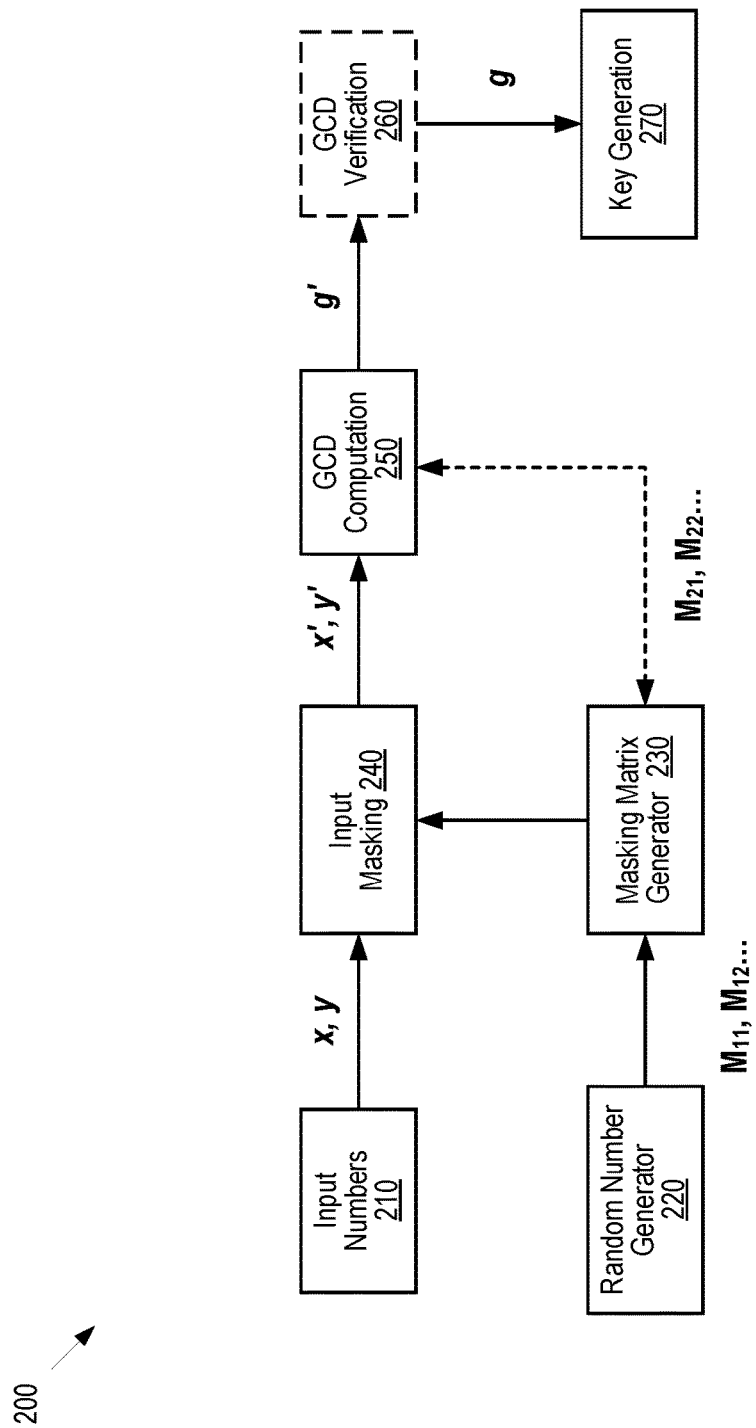
FIG. 2 is a diagram illustrating one example implementation of key generation operations that use matrix masking, in accordance with some aspects of the present disclosure.

FIG. 2 is a diagram illustrating one example implementation of key generation operations 200 that use matrix masking, in accordance with some aspects of the present disclosure. An input into key generation operations 200 may include input numbers 210, e.g., x and y, which may be integer numbers of any bit length, e.g., 256-bit numbers, 1024-bit numbers, 2048-bit numbers, etc. The input numbers 210 may be numbers that are used in RSA generation, e.g., x=p−1 and y=q−1, where p and q are secret prime numbers whose product defines a public modulus, or x=p−1 and y=e. In some implementations, key generation operations 200 may involve computing GCD(x, y) or computing $y^{-1}$ mod x, which may also involve computing GCD(x, y), verifying that GCD(x, y)=1, and extracting $y^{-1}$ mod x (and/or $y^{-1}$ mod x) from certain auxiliary numbers (transform matrix elements) that arise in the course of GCD (x, y) computation.

The GCD computations may be performed by GCD computation module 250, which may include dedicated hardware (e.g., multiplication, addition, bit shifting circuitry) and/or software components. GCD computation module 250 may use the Euclidean algorithm, the binary Euclidean algorithm, the Bernstein-Yang algorithm, or any other suitable algorithm.

For example, according to the extended Euclidean algorithm (and assuming for the sake of specificity that x>y), a two-component vector consisting of x and y may be formed and a transform matrix $\hat{T}$ identified such that the matrix product of the transform matrix and the two-component vector produces another vector whose element is zero:

$$\begin{pmatrix} g \\ 0 \end{pmatrix} = \hat{T} \cdot \begin{pmatrix} x \\ y \end{pmatrix} \equiv \begin{pmatrix} T_{11} & T_{12} \\ T_{21} & T_{22} \end{pmatrix} \cdot \begin{pmatrix} x \\ y \end{pmatrix}.$$

Provided that the determinant of the transform matrix is one or minus one, det $\hat{T}=\pm 1$, the value g is the GCD of x and y or its negative, g=±GCD(x, y). Additionally, it follows from the above equation that $T_{11}$=g|x mod y and $T_{12}$=g|y mod x. Correspondingly, if the input numbers x and y are coprime (g=1), the top row elements of the transform matrix are equal to the inverse of each input number modulo the other input number. The off-diagonal element of the matrix then gives the target inverse number, $T_{12}=x^{-1}$ mod y. The transform matrix $\hat{T}$ may be determined iteratively, by dividing x by y and identifying the quotient $q_0$ and the remainder $x_1$ of the division operation, $$x = q_0 \cdot y + r_1,$$

which may be, equivalently, expressed in the matrix form:

$$\begin{pmatrix} y \\ r_1 \end{pmatrix} = \hat{T}_1 \cdot \begin{pmatrix} x \\ y \end{pmatrix} \equiv \begin{pmatrix} 0 & 1 \\ 1 & -q_0 \end{pmatrix} \cdot \begin{pmatrix} x \\ y \end{pmatrix}$$

via a step matrix $\hat{T}_1$. The process is continued by further dividing x by $r_1$ and finding a new quotient $q_{j-1}$ and a new remainder $r_j$, so that during j-th iteration: $r_{j-2}=q_{j-1} r_{j-1}+r_j$, or in the matrix form (with $r_0 \equiv y$), $$\begin{pmatrix} r_{j-1} \\ r_j \end{pmatrix} = \hat{T}_j \cdot \begin{pmatrix} r_{j-2} \\ r_{j-1} \end{pmatrix} \equiv \begin{pmatrix} 0 & 1 \\ 1 & -q_{j-1} \end{pmatrix} \cdot \begin{pmatrix} r_{j-2} \\ r_{j-1} \end{pmatrix}, j > 1.$$

The iterations stop when during a final (n-th) iteration it is determined that $r_{n-2}$ is divisible by $r_{n-1}$ ($r_{n-2}=q_{n-1} r_{n-1}$); the transform matrix is then given by the product of all identified step matrices:

$$\hat{T} = \prod_{j=1}^{n} \hat{T}_j.$$

In some implementations, the transform matrix T may be computed using the binary Euclidean algorithm that avoids division operations other than division by 2 or powers of 2. More specifically, if x and y are both even, GCD(x, y)=2 GCD (x/2, y/2). If x is even and y is odd, GCD(x, y)=GCD (x/2, y). If both x and y are odd, GCD(x, y)=GCD (|x−y|, min (x, y)). By iteratively repeating these steps, the numbers are progressively reduced until one of the numbers is zero, while the GCD is given by the other number. Computation of the transform matrix using the binary Euclidean algorithm involves a substantial number of division by 2, subtraction, and swapping operations (e.g., performed if the current value of x is less than the current value of y). Division and subtraction operations may be performed in a computationally efficient manner. For example, division by 2 is contingent on the involved number(s) being even (or, more generally, divisible by 2') and is determined based on a single (or, more generally, m) least significant bits of the respective number. The division is then performed by bit-shifting. Subtraction operations may be performed in a streaming fashion, with lower words (groups of bits) processed before higher words. The swapping operations, on the other hand, may depend on which number (x or y) is greater than the other number, with the corresponding determination depending on the highest non-zero word of each number.

To avoid delaying computations until the highest words are determined, in some implementations, GCD computation module 250 may take advantage of the 2019 Bernstein-Yang algorithm for modular inversion. More specifically, the numerical comparisons of x and y may be replaced with a uniformity tracker 6 that indicates a degree of uniformity to which step matrix $\hat{T}_j$ is reducing the numbers x and y. As a result, the first k steps of computations of the transform matrix, $\Pi_{j=1}^{k}\hat{T}_j$, may be performed based on k least significant bits of the numbers x and y before the computed matrix is applied to x and y. The numbers x and y may then be updated by multiplication of $\Pi_{j=1}^{k}\hat{T}_j$ to the (column) vector made of x and y. The same procedure may be then repeated starting with updated values of x and y.

In some implementations, for additional computational efficiency, iterative computation of the transform matrix $\hat{T}$ may determine only a portion of the transition matrix, e.g., the elements of its top row, $T_{11}$ and $T_{12}$, which determine the GCD value, $g=T_{11}x+T_{12}y$. The remaining components of the transform matrix then follow from the condition that $T_{21}x+T_{22}y=0$, and the known value of the determinant, $T_{11}T_{22}-T_{12}T_{21}=-1$; more specifically, $$T_{21}=y/g, T_{22}=-x/g$$

As illustrated in FIG. 2, in some implementations, the process of determining the transform matrix $\hat{T}$ may first be obfuscated (masked) in a way that does not reveal the input numbers x and y or the remainders $r_j$ derived from the input numbers. At input masking 240, the input numbers x and y may be masked using a masking matrix M, e.g., $$\begin{pmatrix} x' \\ y' \end{pmatrix} = \hat{M} \cdot \begin{pmatrix} x \\ y \end{pmatrix}.$$

In some implementations, the masking matrix M may be a matrix whose elements $M_{11}$, $M_{12}$, $M_{21}$, and $M_{22}$ are random numbers generated by a random number generator 220. In some implementations, additional selection (pre-processing) of the masking matrices may be performed by a masking matrix generation module 230. For example, masking matrix generation module 230 may verify that the determinant of the masking matrix $\hat{M}$ is non-zero. In some implementations, masking matrix generation module 230 may further verify that the determinant of the masking matrix $\hat{M}$ is not divisible by some small prime number (e.g., a prime number less than sixteen); for example, that the determinant is a number that is nonzero modulo 2, e.g., that the determinant's least significant bit is one. In some implementations, masking matrix generation module 230 may ensure that the determinant of the selected masking matrix $\hat{M}$ is equal to one: $M_{11} \cdot M_{22} - M_{12} \cdot M_{21} = 1$. This forces the GCD of the masked input numbers to be the same as the GCD of the (original) input numbers, GCD(x', y')=GCD(x, y).

To ensure that det $\hat{M}=1$, masking matrix generation module 230 may select a matrix that depends on a single random number whose value does not affect the determinant, e.g.

$$\hat{M} = \begin{pmatrix} 0 & -1 \\ 1 & M_{22} \end{pmatrix},$$

or $$\hat{M} = \begin{pmatrix} 1 & 0 \\ M_{21} & 1 \end{pmatrix},$$

or any other suitable matrix, or a product of several such matrices. In some implementations, masking matrix generation module 230 may select a matrix that depends on multiple, e.g., two, random numbers, such as $M_{11}$ and $M_{12}$, and then compute the GCD of these numbers using another instance of the Euclidean algorithm (as described above), e.g.

$$\begin{pmatrix} g_M \\ 0 \end{pmatrix} = \hat{S} \cdot \begin{pmatrix} M_{11} \\ M_{12} \end{pmatrix} \equiv \begin{pmatrix} S_{11} & S_{12} \\ S_{21} & S_{22} \end{pmatrix} \cdot \begin{pmatrix} M_{11} \\ M_{12} \end{pmatrix}.$$

Next, matrix generation module 230 may check whether $g_M$=GCD($M_{11}$, $M_{12}$) is equal to one or not. If $g_M \neq 1$, matrix generation module 230 may discard at least one of the values $M_{11}$, $M_{12}$ and select and try another pair of values $M_{11}$, $M_{12}$. Once mutually coprime value $M_{11}$ and $M_{12}$ are selected (meaning that $g_M=1$), the remaining elements of the masking matrix may be obtained from the elements of the transform matrix $\hat{S}$: $M_{21} \leftarrow -S_{12}$, $M_{22} \leftarrow S_{11}$. This choice ensures that det $\hat{M}=1$, since by construction $S_{11}M_{11}+S_{12}M_{12}=g_M=1$. Although in the above example, the elements of the first row of the masking matrix are selected randomly, any other suitable partition of the masking matrix may be so selected (e.g., the second row, the first column, the second column) whereas the remaining elements of the masking matrix are determined using the GCD computation.

Once the masking matrix M with determinant det M=1 and one or more random elements has been identified, the masking matrix may be provided to input masking 240 that computes masked inputs x' and y'. The masked inputs are then processed by GCD computation module 250 (e.g. GCD function 154 of FIG. 1) that determines GCD(x', y')≡g', which is the same as the target GCD(x, y)≡g since the presence of the masking matrix does not change the determinant of the transform matrix: det($\hat{T} \cdot \hat{M}$)=−1. Consequently, the correct value of g is computed without revealing the secret input values x and y. The obtained value g may then be provided to a key generation module 270, which may use g for additional operations related to key generation. For example, if x=p−1 and y=q−1, the value g may be used to compute LCM(p−1, q−1)=(p−1)·(q−1)·g. The computed value LCM(p−1, q−1) may then be used to determine the private (decryption) exponent d=$e^{-1}$ mod LCM(p−1, q−1). In other instances, if x=p−1 (or x=q−1) and y=e, the value g indicates if the selected value p (or q) is compatible with the chosen public (encryption) exponent e. If it is determined by key generation module 270 (or a GCD verification module) that GCD (p−1, e)≠1 (or GCD(q−1, e)≠1), the corresponding value p (or q) may be discarded and a new value p (or q) may be selected and tried.

In the above examples, selecting the masking matrix M to have the determinant equal to one ensured that the GCD value is not modified, g'=g. This makes the output g' immediately usable for subsequent operations, but comes at a cost of preprocessing to ensure that the masking matrix M has desired properties. In some implementations, the conditions on the masking matrix may be relaxed while allowing the output g' to be different from the target GCD g. The target GCD g may then be determined based on g'.

More specifically, the masking matrix M may be selected randomly, such that any number of (including all) elements are provided by random number generator 220. The GCD g' of the masked input numbers x' and y' may sometimes be the same as the target GCD g of the (unmasked) input numbers x and y or, in other instances, be a multiple of the target GCD g. For example, the target GCD of x=110 and y=66 is g=22. If a random masking matrix M is selected to be $$\hat{M} = \begin{pmatrix} 2 & 1 \\ 0 & 1 \end{pmatrix},$$

the masked input numbers are x'=286 and y'=66, so that the GCD is g'=22 is the same as the target GCD g. In contrast, if the masking matrix is selected as $$\hat{M} = \begin{pmatrix} 1 & 1 \\ 0 & 2 \end{pmatrix},$$

the masked input numbers are x'=176 and y'=132 and the GCD g'=44 is twice the target GCD g=22.

In some implementations, GCD verification module 260 may verify whether the obtained GCD is equal to the target GCD, g'=g, by performing division operations x/g' and y/g' and checking whether the outputs of these operations are integer values. If at least one of the input numbers x or y is not divisible by g', a new masking matrix M may be selected and the GCD computation may be repeated to generate a new value g'. In some implementations, to reduce exposure of secret values x or y to possible leaks, the values x and/or y may be discarded after a certain predetermined number of attempts, and a new set of input values may be generated, e.g., using a new pair of primes p and/or q. In some implementations, the input values may be discarded after a single unsuccessful attempt to generate g' that is equal to g. It may be shown that in about 60% of attempts, the two GCD values are the same, g'=g, while in 40% of attempts the two GCD values are different.

In some implementations, even if g' ≠g, the target value g may be inferred from g' without discarding g'. More specifically, if g'=ng, the modular reductions x mod g'=ag, y mod g'=bg have to be numbers that are multiples of the target GCD value g with a, b<n. The target GCD may then be computed according to $$g = GCD(x, \mod g', y \mod g', g'),$$

which may be performed via two consecutive GCD operations on the pairs of numbers, e.g., g=GCD(GCD(x, mod g', y mod g'), g').

In some implementations, the two classes of techniques described above, e.g., pre-conditioning of the masking matrix M and post-processing/verification of the computed GCD g', may be used together. For example, forcing the masking matrix M to have an odd determinant may increase the probability of the computed GCD g' to be equal to the target GCD g from about 60% to about 80%. Forcing the determinant det $\hat{M}$ to be odd may be performed by a variety of methods. For example, after the masking matrix M is randomly generated (with any or all of the four elements of M obtained from random number generator 220), masking matrix generator 230 may determine the least significant (denoted via [0]) bit of det $\hat{M}$, e.g., by computing $$\det \hat{M}[0] = (M_{11}[0] \text{XOR } M_{22}[0]) \text{XOR}(M_{12}[0] \text{XOR } M_{21}[0]).$$

If it is determined that the bit value det $\hat{M}$ [0]=0, a new masking matrix M may be generated, e.g., by replacing at least one or more of its elements with new other random values. In some implementations, some of the least significant bits of the masking matrix M elements may be forced to have specific values, e.g., $M_{11}[0]=M_{22}[0]=M_{12}[0]=1$ and $M_{21}[0]=0$, or any other combination ensuring that det $\hat{M}$ [0]=1. In some implementations, the determinant may be forced to be nonzero modulo some small prime, e.g., 3, 5, 7, and the like.

In any implementations, where the masking matrix M is not preprocessed and/or selected to have det $\hat{M}$=1 and, as a result, a possibility exists that g'≠g, any of the techniques described above may be applied by GCD verification module 260 to check whether g'=g or to derive the target GCD value g from the obtained GCD value g'.

Figure 3:
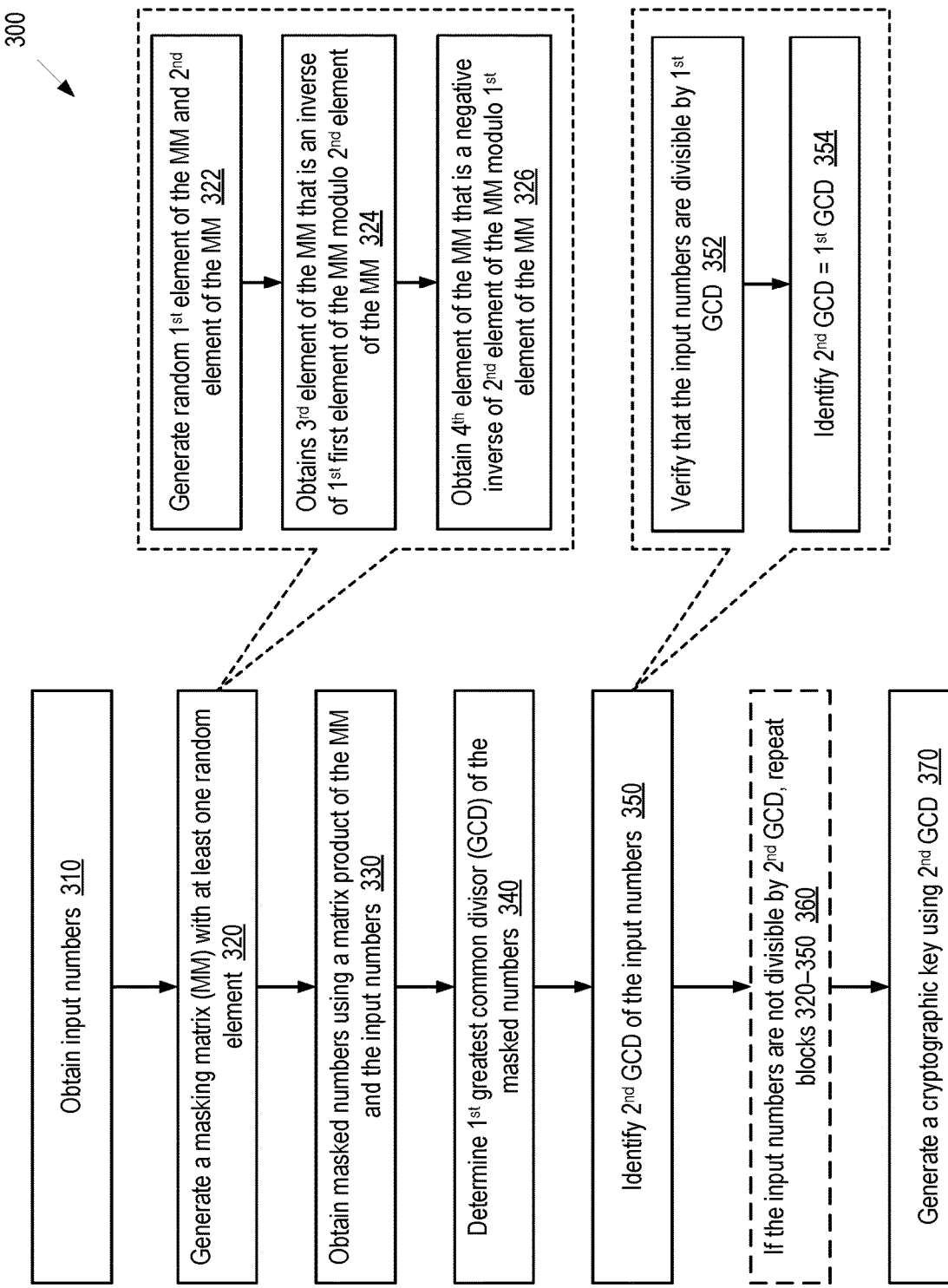
FIG. 3 is a flow diagram depicting a method of matrix-based masking of secret data during cryptographic key generation, in accordance with one or more aspects of the present

FIG. 3 and FIG. 4 are flow diagrams depicting example methods 300 and 400 of using matrix masking for protection of key generation against side-channel attacks in cryptographic applications, in accordance with one or more aspects of the present disclosure. Methods 300 and 400 and each of their individual functions, routines, subroutines, and/or operations may be performed by a cryptographic engine, such as cryptographic accelerator 140 depicted in FIG. 1, or a general-purpose processor, such as processor 120 depicted in FIG. 1. Various blocks of methods 300 and 400 may be performed in a different order compared with the order shown in FIG. 3 and FIG. 4. Some blocks may be performed concurrently with other blocks. Some blocks may be optional. Methods 300 and 400 may be implemented as part of a cryptographic operation, which may involve a public key number and a private key number. The cryptographic operation may include RSA algorithm, or any other suitable operation.

FIG. 3 is a flow diagram depicting method 300 of matrix-based masking of secret data during cryptographic key generation, in accordance with one or more aspects of the present disclosure. At block 310, a processing device performing method 300 may obtain a plurality of input numbers, e.g., x and y, which may be numbers related to secret primes used for key generation, e.g., x=p−1, y=q−1. Some of the numbers may be non-secret, e.g., x=e (public exponent), while other number may be secret, e.g., y=q−1 (a part of the private key). In some implementations, any other combination of input numbers may be used for key generation.

At block 320, method 300 may include generating a masking matrix $\hat{M}$ that has at least one element based on a random value. For example, any (or all) elements $M_{jk}$ of the masking matrix may be random numbers (e.g., generated by a random number generator) or numbers that are obtained using random numbers by performing any suitable operation (e.g., multiplication, addition, exponentiation, inversion, division, etc.) or a set of such operations that involves at least one random number. In some implementations, the masking matrix may include a first element (e.g., $M_{11}$ or any other element) that is obtained using at least a first random number (e.g., $r_1$), and a second element (e.g., $M_{12}$ or any other element) that is obtained using at least a second random number (e.g., $r_2$). For example, the first (and/or second) element may be equal to the first (and/or second) random number, $M_{11}=r_1$ (and $M_{12}=r_2$). Similarly, the first (and/or second) element may be any suitable function of the first (second) random number, e.g., $M_{11}=f(r_1)$ and $M_{12}=g(r_2)$, where f (.) and g (.) are such functions, which may be the same function or different functions. In some implementations, the first (second) element may be any suitable function of both the first and the second random numbers, e.g., $M_{11}=f(r_1, r_2)$ and $M_{12}=g(r_1, r_2)$. The functions f (.) and g(.) may further depend on any additional numbers, which may be random numbers or non-random numbers (e.g., salt values, seed values, etc.). Other elements of the masking matrix may be random numbers, elements that are based on random numbers, elements that are obtained using the first element and/or the second element, or elements that have deterministic values. In some implementations, the generated masking matrix may have an odd determinant. In some implementations, the generated masking matrix may have a determinant that is equal to one. In some implementations, generating a masking matrix with det $\hat{M}$=1 may involve computing one or more modular inverses, e.g., using Euclidean algorithm, the binary Euclidean algorithm, the extended binary Euclidean algorithm, the Bernstein-Yang algorithm, and the like. For example, as illustrated with the top callout portion in FIG. 3, generating the masking matrix may include the following operations. At block 322, method 300 may include generating a random first element of the masking matrix (e.g., $M_{11}$) and a random second element of the MM (e.g., $M_{21}$). At block 324, method 300 may include obtaining a third element of the masking matrix (e.g., $M_{22}$) that is an inverse of the first element of the masking matrix modulo the second element of the masking matrix (e.g., $M_{22}=M_{11}^{-1} \bmod M_{21}$). At block 326, method 300 may further include obtaining a fourth element of the masking matrix (e.g., $M_{12}$) that is a negative inverse of the second element of the masking matrix modulo the first element of the masking matrix (e.g., $M_{12}=-M_{21}^{-1} \bmod M_{11}$. In some implementations, the masking matrix may have a determinant that is equal to one modulo some small a modulus number that is less than 8, 16, etc.

At block 330, the processing device performing method 300 may obtain a plurality of masked numbers (e.g., x' and y') using a matrix product of the masking matrix and the plurality of input numbers. At block 340, the processing device may determine a first greatest common divisor (GCD); the first GCD may be a GCD of the plurality of masked numbers (e.g., g'=GCD(x', y')). At block 350, the processing device may identify, using the first GCD g', a second GCD g; the second GCD may be a (target) GCD of the plurality of the input numbers (e.g., g=GCD(x, y)). In some implementations, as illustrated with the bottom callout portion in FIG. 3, identifying the second GCD g may include, at block 352, verifying that each of the plurality of the input numbers (e.g., x and y) is divisible by the first GCD g'. Responsive to such verification method 300 may continue, at block 354, with identifying the second GCD as being equal to the first GCD, g=g'.

As indicated by block 360, responsive to determining at least one of the plurality of the input numbers (e.g., x or y) is not divisible by the second GCD (and, accordingly, that g≠g'), operations of blocks 320-350 may be repeated. In particular, the processing device performing method 300 may generate a new masking matrix M' and obtain a new plurality of masked numbers (e.g., $x_1$ and $y_1$). using a matrix product of the new masking matrix M' and the plurality of the input numbers (e.g., x and y). The processing device may then determine a third GCD (e.g., $g_1$) that is a GCD of the new plurality of masked numbers and, responsive to verifying that each of the plurality of the input numbers (e.g., x and y) is divisible by the third GCD (e.g., $g_1$), identifying the second GCD as being equal to the third GCD (g=g'). In the instances where the additional (second, third, etc.) attempt at obtaining the target GCD g is still unsuccessful, blocks 320-350 may be repeated again.

At block 370, method 300 may include using the second GCD to generate a cryptographic key, such as, in the non-limiting illustrative example of RSA applications (where x=p-1 and y=q-1), obtaining LCM(x, y)=xy/g, computing a secret RSA exponent $d=e^{-1} \bmod LCM(x, y)$, and/or performing any other (or additional) operation.

In some implementations, rather than discarding (at block 360) the masking matrix and the first GCD g' (or any subsequent GCD), the target (second) GCD g may be determined based on the obtained first GCD g' (or some subsequent GCD), as illustrated with method 400 and FIG. 4.

FIG. 4 is a flow diagram depicting method 400 of recovering a target GCD based on a GCD of masked inputs in the course of matrix-based masking of cryptographic key generation, in accordance with one or more aspects of the present disclosure. Method 400 may be used in conjunction with method 300, e.g., as an alternative to block 360 in FIG. 3. Method 400 may be applied in the implementations that do not force the determinant of the masking matrix to be equal to one. As a result, it is possible that in some (though not necessarily all) instances of method 300 execution, the computed (first) GCD of masked inputs numbers (e.g., x and y) may be different from the target (second) GCD, g≠g'.

Method 400 may include, at block 410, computing a first value u that is a reduction of the first input number x of the plurality of the input numbers modulo the first GCD, e.g., u=x mod g'. At block 420, method 400 may include computing a second value v that is a reduction of the second input number y of the plurality of the input numbers modulo the first GCD, e.g., v=y mod g'. At block 430 method 400 may include identifying the second GCD g using the first value u and the second value v. In one non-limiting example, identifying the second GCD may include computing a GCD of the first value, the second value, and the first GCD: g=GCD(u, v, g').

FIG. 5 depicts a block diagram of an example computer system 500 operating in accordance with one or more aspects of the present disclosure. In various illustrative examples, example computer system 500 may be computer system 102, illustrated in FIG. 1. Example computer system 500 may be connected to other computer systems in a LAN, an intranet, an extranet, and/or the Internet. Computer system 500 may operate in the capacity of a server in a client-server network environment. Computer system 500 may be a personal computer (PC), a set-top box (STB), a server, a network router, switch or bridge, or any device capable of executing a set of instructions (sequential or otherwise) that specify actions to be taken by that device. Further, while only a single example computer system is illustrated, the term "computer" shall also be taken to include any collection of computers that individually or jointly execute a set (or multiple sets) of instructions to perform any one or more of the methods discussed herein.

Example computer system 500 may include a processing device 502 (also referred to as a processor or CPU), a main memory 504 (e.g., read-only memory (ROM), flash memory, dynamic random access memory (DRAM) such as synchronous DRAM (SDRAM), etc.), a static memory 506 (e.g., flash memory, static random access memory (SRAM), etc.), and a secondary memory (e.g., a data storage device 518), which may communicate with each other via a bus 530.

Processing device 502 represents one or more general-purpose processing devices such as a microprocessor, central processing unit, or the like. More particularly, processing device 502 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 502 may also be one or more special-purpose processing devices such as an application specific integrated circuit (ASIC), a field programmable gate array (FPGA), a digital signal processor (DSP), network processor, or the like. In accordance with one or more aspects of the present disclosure, processing device 502 may be configured to execute instructions implementing method 300 of matrix-based masking of secret data during cryptographic key generation and method 400 of recovering a target GCD based on a GCD of masked inputs in the course of matrix-based masking of cryptographic key generation.

Example computer system 500 may further comprise a network interface device 508, which may be communicatively coupled to a network 520. Example computer system 500 may further comprise a video display 510 (e.g., a liquid crystal display (LCD), a touch screen, or a cathode ray tube (CRT)), an alphanumeric input device 512 (e.g., a keyboard), a cursor control device 514 (e.g., a mouse), and an acoustic signal generation device 516 (e.g., a speaker).

Data storage device 518 may include a computer-readable storage medium (or, more specifically, a non-transitory computer-readable storage medium) 528 on which is stored one or more sets of executable instructions 522. In accordance with one or more aspects of the present disclosure, executable instructions 522 may comprise executable instructions implementing method 300 of matrix-based masking of secret data during cryptographic key generation and method 400 of recovering a target GCD based on a GCD of masked inputs in the course of matrix-based masking of cryptographic key generation.

Executable instructions 522 may also reside, completely or at least partially, within main memory 504 and/or within processing device 502 during execution thereof by example computer system 500, main memory 504 and processing device 502 also constituting computer-readable storage media. Executable instructions 522 may further be transmitted or received over a network via network interface device 508.

While the computer-readable storage medium 528 is shown in FIG. 5 as a single medium, the term "computer-readable storage medium" should be taken to include a single medium or multiple media (e.g., a centralized or distributed database, and/or associated caches and servers) that store the one or more sets of operating instructions. The term "computer-readable storage medium" shall also be taken to include any medium that is capable of storing or encoding a set of instructions for execution by the machine that cause the machine to perform any one or more of the methods described herein. The term "computer-readable storage medium" shall accordingly be taken to include, but not be limited to, solid-state memories, and optical and magnetic media.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "identifying," "determining," "storing," "adjusting," "causing," "returning," "comparing," "creating," "stopping," "loading," "copying," "throwing," "replacing," "performing," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Examples of the present disclosure also relate to an apparatus for performing the methods described herein. This apparatus may be specially constructed for the required purposes, or it may be a general purpose computer system selectively programmed by a computer program stored in the computer system. Such a computer program may be stored in a computer readable storage medium, such as, but not limited to, any type of disk including optical disks, CD-ROMs, and magnetic-optical disks, read-only memories (ROMs), random access memories (RAMs), EPROMs, EEPROMs, magnetic disk storage media, optical storage media, flash memory devices, other type of machine-accessible storage media, or any type of media suitable for storing electronic instructions, each coupled to a computer system bus.

The methods and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear as set forth in the description below. In addition, the scope of the present disclosure is not limited to any particular programming language. It will be appreciated that a variety of programming languages may be used to implement the teachings of the present disclosure.

It is to be understood that the above description is intended to be illustrative, and not restrictive. Many other implementation examples will be apparent to those of skill in the art upon reading and understanding the above description. Although the present disclosure describes specific examples, it will be recognized that the systems and methods of the present disclosure are not limited to the examples described herein, but may be practiced with modifications within the scope of the appended claims. Accordingly, the specification and drawings are to be regarded in an illustrative sense rather than a restrictive sense. The scope of the present disclosure should, therefore, be determined with reference to the appended claims, along with the full scope of equivalents to which such claims are entitled.

What is claimed is:

1. A method to generate a cryptographic key, the method comprising:
   obtaining, by a processing device, a plurality of input numbers associated with a cryptographic application;
   generating, by the processing device, a masking matrix (MM), wherein the MM comprises:
      a first element that is obtained using at least a first random number, and
      a second element that is obtained using at least a second random number;
   obtaining, by the processing device, a plurality of masked numbers using a matrix product of the MM and the plurality of input numbers;
   determining, by the processing device, a first greatest common divisor (GCD), wherein the first GCD is a GCD of the plurality of masked numbers;
   identifying, by the processing device, using the first GCD, a second GCD, wherein the second GCD is GCD of the plurality of the input numbers; and
   generating, by the processing device, the cryptographic key using the second GCD.

2. The method of claim 1, wherein the MM has an odd determinant.

3. The method of claim 1, wherein the MM has a determinant that is equal to one or minus one.

4. The method of claim 3, wherein generating the MM comprises:
generating the first element of the MM and the second element of the MM;
obtaining a third element of the MM, wherein the third element of the MM is an inverse of the first element of the MM modulo the second element of the MM; and
obtaining a fourth element of the MM, wherein the fourth element of the MM is a negative inverse of the second element of the MM modulo the first element of the MM.

5. The method of claim 1, wherein the MM has a determinant that is not divisible by a prime number that is less than 16.

6. The method of claim 1, wherein identifying the second GCD comprises:
responsive to verifying that each of the plurality of the input numbers is divisible by the first GCD, identifying the second GCD as being equal to the first GCD.

7. The method of claim 1, wherein identifying the GCD of the plurality of the input numbers comprises:
responsive to determining at least one of the plurality of the input numbers is not divisible by the second GCD, generating a new MM;
obtaining a new plurality of masked numbers using a matrix product of the new MM and the plurality of the input numbers;
determining a third GCD, wherein the third GCD is a GCD of the new plurality of masked numbers; and
responsive to verifying that each of the plurality of the input numbers is divisible by the third GCD, identifying the second GCD as being equal to the third GCD.

8. The method of claim 1, wherein identifying the second GCD comprises:
computing a first value, wherein the first value is a reduction of a first input number of the plurality of the input numbers modulo the first GCD;
computing a second value, wherein the second value is a reduction of a second input number of the plurality of the input numbers modulo the first GCD; and
identifying the second GCD using the first value and the second value.

9. The method of claim 8, wherein identifying the second GCD comprises computing a GCD of the first value, the second value, and the first GCD.

10. A system comprising:
a memory device; and
a processing device communicatively coupled to the memory device, the processing device to:
obtain a plurality of input numbers associated with a cryptographic application;
generate a masking matrix (MM), wherein the MM comprises
a first element that is obtained using at least a first random number, and
a second element that is obtained using at least a second random number;
obtain a plurality of masked numbers using a matrix product of the MM and the plurality of input numbers;
determine a first greatest common divisor (GCD), wherein the first GCD is a GCD of the plurality of masked numbers;
identify, using the first GCD, a second GCD, wherein the second GCD is GCD of the plurality of the input numbers; and
generate a cryptographic key using the second GCD.

11. The system of claim 10, wherein the MM has an odd determinant.

12. The system of claim 10, wherein to generate the MM, the processing device is to:
generate the first element of the MM and the second element of the MM;
obtain a third element of the MM, wherein the third element of the MM is an inverse of the first element of the MM modulo the second element of the MM; and
obtain a fourth element of the MM, wherein the fourth element of the MM is a negative inverse of the second element of the MM modulo the first element of the MM.

13. The system of claim 10, wherein to identify the second GCD, the processing device is to:
verify that each of the plurality of the input numbers is divisible by the first GCD; and
identify the second GCD as being equal to the first GCD.

14. The system of claim 10, wherein to identify the second GCD, the processing device is to:
responsive to determining at least one of the plurality of the input numbers is not divisible by the second GCD, generate a new MM;
obtain a new plurality of masked numbers using a matrix product of the new MM and the plurality of the input numbers;
determine a third GCD, wherein the third GCD is a GCD of the new plurality of masked numbers; and
responsive to verifying that each of the plurality of the input numbers is divisible by the third GCD, identify the second GCD as being equal to the third GCD.

15. The system of claim 10, wherein to identify the second GCD, the processing device is to:
compute a first value, wherein the first value is a reduction of a first input number of the plurality of the input numbers modulo the first GCD;
compute a second value, wherein the second value is a reduction of a second input number of the plurality of the input numbers modulo the first GCD; and
identify the second GCD using the first value and the second value.

16. A non-transitory computer-readable memory storing instructions that, when executed by a processing device, cause the processing device to:
obtain a plurality of input numbers associated with a cryptographic application;
generate a masking matrix (MIN), wherein the MM comprises:
a first element that is obtained using at least a first random number, and
a second element that is obtained using at least a second random number;
obtain a plurality of masked numbers using a matrix product of the MINI and the plurality of input numbers;
determine a first greatest common divisor (GCD), wherein the first GCD is a GCD of the plurality of masked numbers;
identify, using the first GCD, a second GCD, wherein the second GCD is GCD of the plurality of the input numbers; and
generate a cryptographic key using the second GCD.

17. The non-transitory computer-readable memory of claim 16, wherein to generate the MM, the instructions are to cause the processing device to:
generate the first element of the MM and the second element of the MM;

obtain a third element of the MM, wherein the third element of the MM is an inverse of the first element of the MM modulo the second element of the MM; and obtain a fourth element of the MM, wherein the fourth element of the MM is a negative inverse of the second element of the MM modulo the first element of the MM.

18. The non-transitory computer-readable memory of claim 16, wherein to identify the second GCD, the instructions are to cause the processing device to:

verify that each of the plurality of the input numbers is divisible by the first GCD; and identify the second GCD as being equal to the first GCD.

19. The non-transitory computer-readable memory of claim 16, wherein to identify the second GCD, the instructions are to cause the processing device to:

responsive to determining at least one of the plurality of the input numbers is not divisible by the second GCD, generate a new MM;

obtain a new plurality of masked numbers using a matrix product of the new MM and the plurality of the input numbers;

determine a third GCD, wherein the third GCD is a GCD of the new plurality of masked numbers; and responsive to verifying that each of the plurality of the input numbers is divisible by the third GCD, identify the second GCD as being equal to the third GCD.

20. The non-transitory computer-readable memory of claim 16, wherein to identify the second GCD, the instructions are to cause the processing device to:

compute a first value, wherein the first value is a reduction of a first input number of the plurality of the input numbers modulo the first GCD;

compute a second value, wherein the second value is a reduction of a second input number of the plurality of the input numbers modulo the first GCD; and identify the second GCD using the first value and the second value.

\* \* \* \* \*